Oct. 8, 1946.   O. L. GARRETSON ET AL   2,408,842
AUTOMATIC CYLINDER FILLING DEVICE
Filed June 22, 1942   2 Sheets-Sheet 1

INVENTOR
T. A. ST. CLAIR, O. L. GARRETSON,
A. R. OLSON
BY
ATTORNEYS

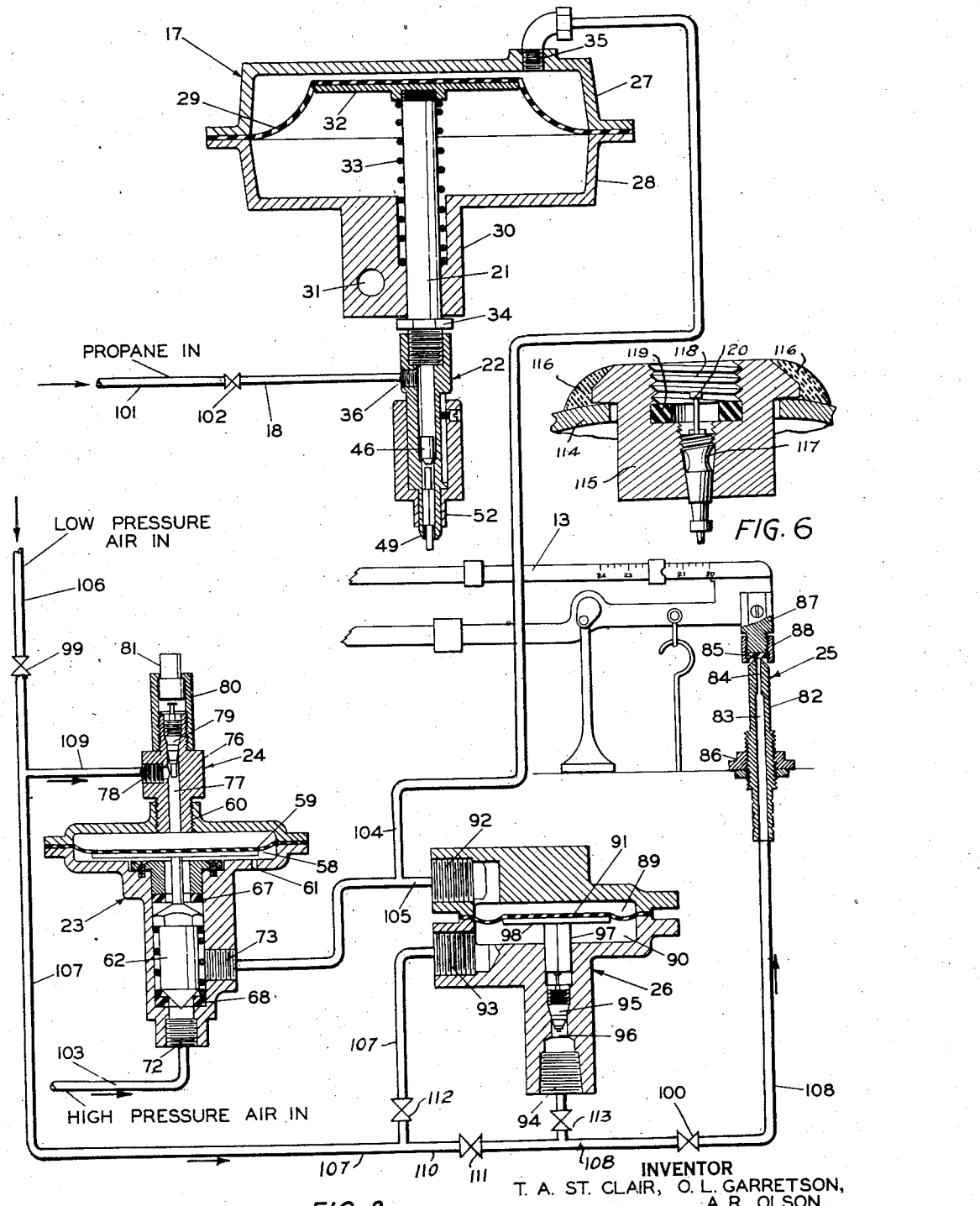

Patented Oct. 8, 1946

2,408,842

UNITED STATES PATENT OFFICE 2,408,842

AUTOMATIC CYLINDER FILLING DEVICE

Owen L. Garretson, Bartlesville, Okla., and Theodore A. St. Clair, Pontiac, and Andrew R. Olson, Detroit, Mich., assignors to Phillips Petroleum Company, a corporation of Delaware Application June 22, 1942, Serial No. 448,022

20 Claims. (Cl. 249—63)

Our invention relates to automatic means for filling enclosed pressure vessels with a volatile liquid or a gas.

More specifically, our invention comprises a completely automatic system which is of particular utility in the filling of liquefied petroleum gas cylinders. Our assignee company has been active in the development of a method of distribution of propane which involves the use of a small portable cylinder of 20 pound propane capacity, the system in question being well known to the trade as the "Philgas self service system."

In connection with the maintenance of the above type of distribution system, it has become incumbent upon the said company to refill several thousands of these small cylinders daily in supplying customers' requirements. This operation has until now been done manually, and the labor cost involved for cylinder filling alone has become a quite considerable sum, and is of course, reflected in the price that customers must pay for their gas service.

In the manual filling of these cylinders, the operators have been required to place the cylinders individually on platform type scales, make connection manually between the charging line and the cylinder, set the scale beam to the desired weight, turn on the charging line, turn off the charging line when the cylinder has reached the correct gross weight, disconnect and remove the cylinder. With the automatic device here disclosed, the operators will need only to place the cylinders on the scales, set the scale beam, press a control button and remove the cylinders when filled. The operations of making connection, turning on the gas, shutting off and disconnecting are eliminated. Watching of the scale beam or dial is also eliminated, since our device automatically shuts off the flow and disconnects the cylinder when the correct weight has been reached.

It is an object of our invention to materially reduce the labor cost per unit filled in the operation described.

It is a further object to improve working conditions in cylinder charging rooms by reducing the number of manual operations and to simplify the mental operations involved in filling cylinders accurately to the required gross weight.

It is an object to further improve charging room working conditions by eliminating the hazard of receiving dehydration burns about the operator's hands, which hazard has been present in manual operations heretofore.

It is also an object to remove as far as possible the human element in attainment of the final required filled weight, thus minimizing the possibility of overfilling of cylinders beyond the permissible loading density, and hence improving the safety factor of the service rendered the customer.

Other objects and advantages are to be realized from the structure disclosed in our following specification, in which Figure 1 is a full front elevation showing in part the general disposition of our assembled apparatus.

Figure 3 is a schematic diagram illustrating the operation of our invention and in which all the operating elements are shown in section.

Figure 6 is a simplified cross sectional view of the type valve in the top of a gas container cylinder which the structure of Figure 5 is designed to cooperate with.

Figure 1:
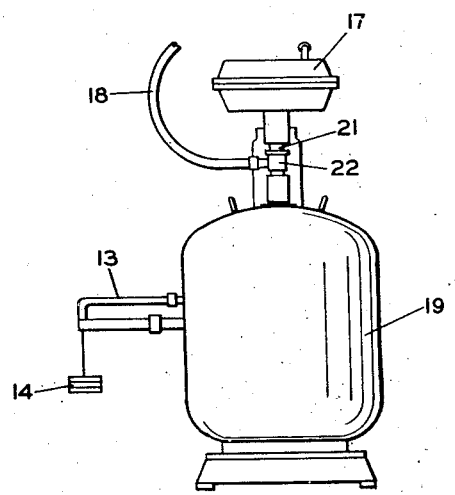
Figure 2:
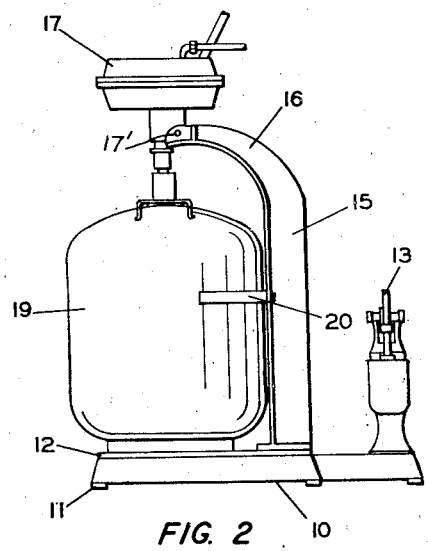
Figure 2 is a side view of the apparatus of Figure 1.

Referring particularly to Figures 1 and 2, the numeral 10 indicates generally a platform bench scale, whose principal elements are the base 11, loading platform 12, the balance beam 13 and weights 14. Any conventional scale which has these elements may be adapted to our purpose.

Firmly secured to the platform 12 is an upright column member 15, having an arched portion 16 extending forwardly over the center of the scale platform. Pivotally supported by the column member is a diaphragm power unit 17, which is adapted to establish communication between the charging hose 18 and the cylinder to be filled, 19. A curved guide piece 20, attached to upright 15, serves to center the cylinder with respect to the power unit 17. Attached to the shaft 21 of the diaphragm power unit is an automatic propane connector and valve 22.

Power operated unit 17 is pivoted by means of pivot pin 17' on arm 16, which pin passes through hole 31 in portion 30 of the power unit 17. It will be noted in Figure 3 and elsewhere that hole 31 is distinctly off center relative to the center of gravity of the device, the center of gravity obviously lying somewhere between 31 and the axis of 21.

The general operation of our system is as follows. A cylinder to be filled is placed on the scale platform, and weights 14 sufficient to balance the desired filled cylinder weight are supplied. By operation of control devices, to be described fully in connection with the other drawings, the diaphragm power unit 17 is energized with air pressure and the propane connector-valve 22 is thus placed in communication with the cylinder 19. Propane immediately flows into the cylinder, since the valve in connector 22 is self-opening upon contact with the cylinder valve. When the cylinder reaches the predetermined filled weight, overbalancing of the scale beam causes disconnection and closing of the cylinder and charging-line valves.

As hole 31 is off center the top of 17 will fall forward away from stand 16 and the connector 50 will rise backward under 16 where 50 will be out of the way every time 50 is not engaged with part 115 of a cylinder 19.

Referring now to Figure 3, the complete detail of all control devices is shown together with the interconnecting piping. In this diagram, the numeral 17 again indicates the diaphragm power unit; 23 indicates generally a relay valve for controlling power unit 17; 24 indicates a manual vent valve which serves as the operator's control to start the filling operation; 25 indicates means whereby the filling operation is automatically stopped upon attainment of a desired degree of filling, and 26 indicates generally an automatic valve which prevents re-operation of the device until such time as the operator again presses the control button on valve 24.

The power unit 17 consists of a pair of covers 27 and 28 between which is secured a rubber diaphragm 29. The lower cover is provided with a projecting portion 30 which is drilled at 31 to provide for mounting on the supporting member 16 of Figure 1. The portion 30 is also bored to provide a guide for shaft 21. A circular bearing plate 32 is threaded on the upper end of shaft 21, and a spring 33 loads the shaft, plate and diaphragm upwardly. The propane connector valve 22 is threaded to the lower end of shaft 21 and secured by a locknut 34. Inlet 35 admits air pressure to diaphragm 29, and inlet 36 on the connector 22 is provided for connection to the propane charging hose 18.

Figure 5:
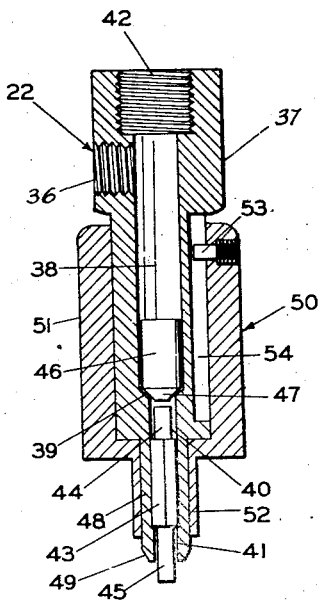
Figure 5 is a like view of another operating element from Figure 3.

Figure 5 illustrates further in detail the connector 22, in which the main body portion 37 is bored on varying diameters to form a channel 38 having a seating shoulder 39, and successively smaller channels 40 and 41. The charging hose connection 36 is tapped in the side of member 37, in communication with the progressively reduced channels above referred to. The threaded opening 42 is fitted with a straight machine thread to receive the threaded end of shaft 21 of the diaphragm power unit 17 (Figures 1 and 2). There is no fluid communication through opening 42 with any other element of the assembly. The shaft 21 is of solid, unbored construction and effectively plugs the opening.

A square pushpin 43 having round reduced sections 44 and 45 fits loosely in bore 40. The diagonal distance across corners of the square section is greater than the diameter of bore 41, however, and motion of the pushpin in a downward direction is limited thereby. A valve slug 46 of synthetic rubber, or other resilient material having the necessary resistance to swelling or deterioration in propane, is loosely retained in bore 38. This slug has a tapered portion 47 adapted to make seating engagement with ledge 39 when pressured from above by the propane charging line pressure.

An extended portion 48 of member 37 is provided with a tapered nose section 49 which makes sealing engagement with a gasket in the boss of the cylinder to be filled. (The cylinders with which this filler device is to be used are equipped with tire-valve type tap plugs of the sort fully described in U. S. Patent No. 2,172,311 to R. W. Thomas, issued September 5, 1939. Figure 6 of the present case is a simplified view of Figure 1 of said Thomas patent.)

Surrounding the member 37 is a protective sleeve guide piece 50, bored on two diameters to provide a free sliding fit with respect to member 37. The outside of member 50 is contoured similarly to member 37, having major and minor diameters forming portions 51 and 52. A pin 53 is screwed into piece 50, a portion of the pin being extended into a milled-out slot 54 in one wall of member 37. Thus the sliding travel of member 50 on member 37 is limited and the members are rendered non-separable.

In the operation of connector 22, a cylinder to be filled is placed on the scale platform with its valve plug in approximate alignment with the axis of shaft 21 and connector 22, the approximate alignment being had with the aid of cylinder guide piece 20 (see Figure 2). The guide sleeve 50 is held in the uppermost position shown in Figure 5 by grasping with the fingers at surface 51 while locating the cylinder on the scale. The sleeve is then released, allowing it to drop down, when the reduced portion 52 should enter the opening in the cylinder valve tap plug. This assures alignment of the nose-piece 49 with the tap-plug, so that upon subsequent operation of the diaphragm power unit, the nose-piece 49, the pushpin tip 45 and the cylinder valve stem will be protected from damage which would otherwise be likely to occur.

Upon actuation of the power connector, member 37 on shaft 21 moves downward within the guide sleeve and tip 45 of pushpin 43 contacts the stem of the tire valve core in the cylinder. When the cylinder valve core reaches the wide-open limit, further motion of the connector will cause pushpin 43 to unseat slug 46 against the pressure of propane in the charging hose and in channel 38. The nose section 49 will meanwhile have contacted and compressed the resilient gasket in the cylinder tap plug, establishing sealed communication between channel 38 and the cylinder interior. Propane will flow into the cylinder under a differential imposed by the charging line pressure so long as the connector 22 is maintained in engagement with the cylinder tap plug. The valve core in the cylinder tap plug, having a fairly weak spring, will be held open during filling by the differential pressure across slug valve member 46, acting through pushpin 43.

Figure 4:
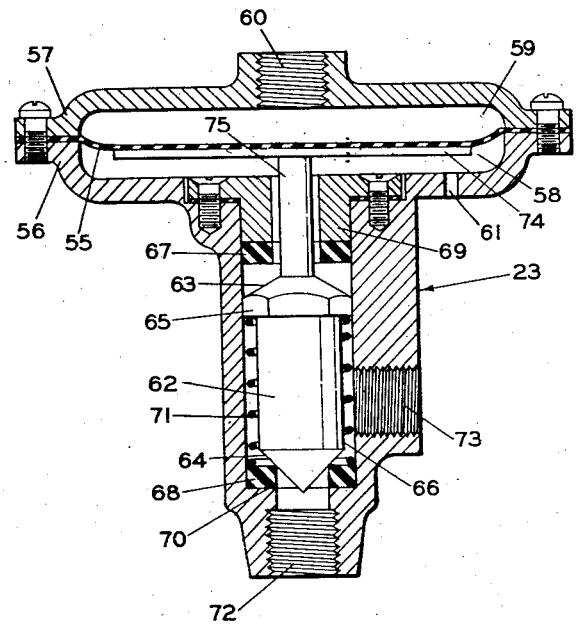
Figure 4 is an enlarged view of an element from Figure 3.

The pilot operator 23 of Figure 3 is illustrated in enlarged detail in Figure 4. Referring to that view, a flexible diaphragm 55 is securely clamped between the flanges of body 56 and cover 57, thus forming two chambers 58 and 59. A threaded opening 60 is provided in cover 57, and one or more vents 61 are provided in body 56. In the lower portion of body 56 is enhoused a double-acting valve 62, having upper and lower seating faces 63 and 64, respectively. A hexagonal or other non-circular section 65 is provided on the valve member for guiding purposes. The shape of section chosen here is immaterial, so long as the valve is well-guided in its chamber 66 and an appreciable flow-way around the guiding portion is afforded. Resilient seat rings 67 and 68 are provided, as shown. Ring 67 is cemented, vulcanized or otherwise secured to the inserted backup member 69. Ring 68 is merely inserted against ledge 70 in the body bore. Spring 71 loads the valve member toward the upper seat and also serves to retain the lower ring. An inlet 72 and an outlet 73 are provided in communication with chamber 66. Valve member 62 is operated by diaphragm 55 through backup plate 74 and stem 75.

Referring again to Figure 3, the vent valve 24 is connected to the opening 60 of the pilot operator, or may be screwed directly therein, as shown. The vent valve consists of a body 76 having a channel 77 in communication with an inlet 78. In an upwardly extended portion of channel 77, above the inlet 78, is threaded a valve 79 of the tire core type. An inwardly flanged sleeve member 80 is provided to retain a pushbutton element 81. This element is provided simply to facilitate manual opening of the tire valve core when such operation is required. Valve 79 vents to the atmosphere through clearance between button 81 and sleeve 80.

The scale-operated shutoff 25 consists of a nipple member 82 having a bore 83, a restricted terminus 84, and a closure disc 85 of resilient material. The nipple 82 is attached by any convenient means, such as locknut 86, to a part of the scale frame. The resilient disc is secured to the scale beam 13 by means of a mounting piece 87 and threaded retainer 88.

The automatic shutoff 26 consists of a casing having its interior divided into two chambers 89 and 90 by a diaphragm 91. Chambers 89 and 90 are provided with inlets 92 and 93, respectively. Chamber 90 is also furnished with an outlet 94, communication with which is had through a tire valve 95 in channel 96. A pushpin 97 of square or other non-circular cross-section and having an appended back-up plate 98 renders valve 95 operable by diaphragm 91.

The valve 99 in the piping of Figure 3 is an adjustable needle valve. Valve 100 is any convenient type of quick-acting line valve; an ordinary plug type stockcock with a T-handle is adequate. Valve 99 is for the purpose of providing a bleed or restriction in the associated line; if a large quantity of systems of identical design were to be built, a fixed orifice would be appropriate for use in place of the needle valve. The stop cock or other valve 100 is simply an emergency shutoff.

The piping consists of a low pressure air system, a high pressure air system, and a liquid propane system.

The propane system consists of a pipe 101 in communication with a liquid propane pump (not shown) and the flexible charging hose 18 previously referred to. A valve 102 is provided for emergency use in case of hose breakage or other contingency.

The high pressure air system consists of a supply pipe 103, a continuation 104 and branch 105, connected as shown.

The low pressure air system includes a supply pipe 106 having a choke orifice, or needle valve 99 therein, pipe 106 branching into pipes 107 and 109. Pipe 107 has a valve 112 therein and is connected at 93 to the shutoff 26. Pipe 109 is connected at 78 to the vent valve 24. Pipe 108 connects the shutoff 26 at 94 to the scale operated shutoff 25 and has two valves 100 and 113 therein. Pipes 107 and 108 may be connected by a pipe 110 having a valve 111 therein, all as shown in Figure 3.

The function of pipe 110 and valves 111; 112 and 113 is to provide two modifications of the invention.

In the preferred modification valve 111 is shut, there is no flow in pipe 110 and valves 112 and 113 are wide open and offer substantially no resistance to flow in pipes 107 and 108. In this modification the push button 81 starts the operation of the device and valve 100 is wide open and only closed in an emergency if at all.

In the secondary modification valve 111 is open wide and offers substantially no resistance to flow through pipe 110 while valves 112 and 113 are shut tight. In this modification push button 81 is never touched, and in fact fitting 76 could be replaced by a simple elbow pipe connecting pipe 109 to 60, and the operation carried on by manipulating valve 100.

The top of the gas containing cylinders, such as 114 of Figure 6 may have a valve body 115 secured in an opening therein by deposited welding metal 116. The mode of securing is immaterial, the important features being that the body 115 contains a tire core valve 117 at the bottom of a depression 118 which depression is usually screw threaded. A sealing gasket 119 of artificial rubber, or other resilient hydrocarbon resistant material is positioned in a groove at the bottom of the depression to cooperate with the sealing surface 49, or with a connection (not shown) to fit in the depression when the container is connected to a stove or other appliance (not shown). The inner surface of depression 118 acts to guide the guide sleeve 52 and sleeve 52 in turn guides nose 49 to seat on gasket 119. In turn nose 49 guides push pin 45 to contact a valve stem 120 of the valve 117.

The terms "high pressure" and "low pressure" as herein used are relative terms. We have found that, with a diaphragm power unit 17 of convenient size, a pressure of 10 pounds per square inch is adequate for our purposes, and constitutes the "high" pressure herein referred to. For the remaining or "low pressure" operation, we have found 1½ pounds per square inch to be satisfactory. The limiting factors with regard to pressures are that the diaphragm power unit must be furnished with a high enough pressure to provide positive sealing between connector 22 and the cylinder tap plug gasket, while pressure at the scale shutoff 25 must not be high enough to exert a disturbing force on the scale beam. The actual pressures, of course, depend on the size and characteristics of specific parts employed.

Having sufficiently described the details of our system to make understandable their construction and to some extent their manner of operation, the operation of the complete assembled system will now be given, for which reference will be had to Figure 3.

The operation of the preferred modification with valves 112 and 113 open and valve 111 closed will be described first.

With air supplied at suitable pressures to the high and low pressure supply pipes 103 and 106, all of the low pressure system will be under pressure up to valve 95. Diaphragm 91 in valve 26 will be loaded on the under side, allowing valve 95 to remain closed under loading of its self-contained spring. The top of diaphragm 59 in pilot valve 24 will be pressured, holding valve 62 closed against seating ring 68. Hence the power unit 17 will be unpressured, and shaft 21 and connector 22 will remain in their uppermost position. The slug 46 will be in the lower or closed position, preventing flow of propane from the charging hose 13.

When an empty cylinder has been placed on the scale and the weights are adjusted to the desired gross value (cylinder tare weight plus desired propane content) the lower portion 52 of connector guide 50 is dropped into the tap-plug recess and the outfit is ready for operation. The scale-operated shutoff 25 will be open; that is, resilient disc 85 will be held away from nipple 82 due to the unbalanced condition of the scale beam.

To begin operation of the mechanism, the operator presses push-button 81, which opens valve 79 and allows the pressure in all parts of the low pressure system beyond needle valve 99 to drop to atmospheric pressure, or substantially so. It is understood that needle valve 99 has been pre-adjusted to restrict flow from the supply pipe 106 sufficiently to prevent maintenance of any appreciable pressure therebeyond so long as vent valve 79 is open. The venting of the low pressure system in the above manner results in unloading of diaphragm 59 in the pilot operator 23. The valve 62 will hence rise to its upper position, admitting high pressure air thereby to the top of diaphragm 29 in power unit 17. The connector 22 will thus be depressed firmly into the cylinder boss or tap plug, causing the cylinder valve and the slug valve 46 to be opened practically simultaneously with the establishment of pressure-tight engagement of nose-piece 49 with the tap plug gasket, all as previously described. Thus flow of propane into the cylinder is begun.

It is to be understood that the push-button 81 need only be depressed for an instant, since operation of the pilot operator also admits high pressure air to the top of diaphragm 91 in the automatic valve 26. This pressure in chamber 89 depresses the pushpin 97, opening valve 95. Flow is thus established through line 108 and from restricted portion 84 of nipple 82, to the atmosphere. The restriction 84 is of greater capacity than is the needle valve or fixed orifice restriction 99 (whichever is used) and hence, pressure at all points beyond 99 will be substantially atmospheric, or a very few inches of water thereabove, as long as shutoff devices 25 and 26 are both open.

When the weight of propane in the filling cylinder becomes sufficient to balance the scale, shutoff 25 becomes closed and back-pressure in the lines 107, 108, and 109 will build up, re-loading diaphragm 59. The valve member 62 will again seat on ring 68, unseating from ring 67. Thus the high pressure inlet 72 is closed off and pressure in lines 104 and 105 and above diaphragms 29 and 91 will be vented to the atmosphere via chamber 58 and vent hole or holes 61. The connector 22 will immediately rise, breaking connection with the cylinder and allowing slug 46 and the cylinder valve to close. Valve 95 will also close in view of the low pressure below diaphragm 91 and the removal of high pressure from above it. This is necessary to prevent premature reoperation of the system when the filled cylinder is removed from the scale, at which time shutoff 25 will be opened.

Connector 22 is raised and 17 being pivoted off center at 17' will fall forward and place part 22 back out of the way under 16 so that cylinder 10 may be removed easily.

The above is a description of a complete cycle of operation. To repeat the operation, it is only necessary to place the next empty cylinder on the scale, adjust the weights, place guide sleeve 52 in the cylinder tap-plug recess and press button 81. Emergency disconnection of the charging line from the cylinder may be effected at any time during the filling operation by manually closing valve 100.

The operation of the secondary modification in which valves 112 and 113 are closed and valve 111 is open will now be described.

It is understood that the automatic valve device 26 is necessary only to prevent re-operation upon opening of shutoff 25 when the filled cylinder is removed from the scale. This device may be dispensed with if desired, by closing valves 112 and 113 and opening valve 111 and the above mentioned secondary operation carried on with the manipulation of valve 100. Pushbutton vent valve 24 is in this case also not used, or may be omitted, line 109 being connected directly to opening 60 of the pilot operator. In this case, operation of the system is initiated by opening of valve 100 and shutoff 25 will terminate the operation in the normal manner when the cylinder becomes filled sufficiently to balance the scale. After operation of the device to disconnect, however, the operator must remember to re-close valve 100 before removing the filled cylinder from the scale, otherwise opening of shutoff 25 upon removal of the cylinder will immediately cause re-operation of the relay or pilot operator 23 and hence of power unit 17. This presents a hazard to both the equipment and the personnel handling it. The inclusion of elements 24 and 26 in the system is, therefore, highly desirable and is recommended for the sake of safety.

In operation under actual service conditions, it has been found that one operator can easily handle a battery of six automatic filling devices, such as the one herein described, with the assistance of two helpers to truck the empty and filled cylinders in and out of the charging room. Under average conditions, the output of filled cylinders (20 pound propane capacity) from this battery of six units is 120 cylinders per hour. Under optimum conditions, this rate has reached as much as 145 cylinders per hour.

The device will continually and consistently fill 20 pound capacity cylinders (gross weight about 42–43 pounds) to within 2 ounces plus or minus from the nominal or theoretical loaded weight. Regulatory bodies having jurisdiction over the rules for loading such pressure vessels require an accuracy of ¼ pound (4 ounces) plus or minus from the nominal loaded weight.

While a preferred form of our invention has been described with considerable mechanical detail, the scope of our invention is not limited except as to the scope of the appended claims.

We claim:

1. Apparatus for filling cylinders each of said cylinders having an inlet and a check valve controlling said inlet, with a predetermined standard weight of fluid, comprising in combination cylinder weighing means, a fluid dispensing line for filling said cylinders with fluid, means for positioning one of said cylinders so that it is weighed by the cylinder weighing means and is aligned for connection to said fluid dispensing line, connecting means for connecting said line to said cylinder and for opening said check valve, disconnecting means urging said connecting means away from and out of connection with said cylinder, power operated means for overcoming said disconnecting means and for connecting said fluid line and said cylinder by said connecting means, pressure responsive means normally operative to render said power operated means inoperative, manually controlled means for rendering said pressure responsive means inoperative at will, weight controlled means for rendering said pressure responsive means operative upon the cylinder being filled with the standard weight of fluid to render said power operated means inoperative, and means preventing more than one such operation of said weight controlled means between any two manual actuations of said manually controlled means whereby random operation of said power operated means is prevented, said connecting means comprising a check valve controlling flow of fluid from the dispensing line, said check valves being opened by said connecting means at the time of connection of said line to said cylinder whereby loss of fluid into the atmosphere is prevented.

2. Apparatus for filling cylinders each of said cylinders having an inlet and a check valve controlling said inlet, with a predetermined standard weight of fluid, comprising in combination cylinder weighing means, a fluid dispensing line for filling said cylinders with fluid, means for positioning one of said cylinders so that it is weighed by the cylinder weighing means and is aligned for connection to said fluid dispensing line, connecting means for connecting said line to said cylinder and for opening said check valve, disconnecting means urging said connecting means away from and out of connection with said cylinder, power operated means for overcoming said disconnecting means and for connecting said fluid line and said cylinder by said connecting means, pressure responsive means normally operative to render said power operated means inoperative, manually controlled means for rendering said pressure responsive means inoperative at will, weight controlled means for rendering said pressure responsive means operative upon the cylinder being filled with the standard weight of fluid, and means preventing more than one such operation of said weight controlled means between any two manual actuations of said manually controlled means whereby random operation of said power operated means is prevented.

3. Apparatus for filling cylinders each of said cylinders having an inlet and a check valve controlling said inlet, with a predetermined standard weight of fluid, comprising in combination cylinder weighing means, a fluid dispensing line for filling said cylinders with fluid, means for positioning one of said cylinders so that it is weighed by the cylinder weighing means and is aligned for connection to said fluid dispensing line, connecting means for connecting said line to said cylinder and for opening said check valve, disconnecting means urging said connecting means away from and out of connection with said cylinder, power operated means for overcoming said disconnecting means and for connecting said fluid line and said cylinder by said connecting means, manually controlled means for causing actuation of said power operated means at will, and weight controlled means for rendering said power operated means inoperative upon the cylinder being filled with the standard weight of fluid.

4. Apparatus for filling cylinders each of said cylinders having an inlet and a check valve controlling said inlet, with a predetermined standard weight of fluid, comprising in combination cylinder weighing means, a fluid dispensing line for filling said cylinders with fluid, means for positioning one of said cylinders so that it is weighed by the cylinder weighing means and is aligned for connection to said fluid dispensing line, connecting means for connecting said line to said cylinder and for opening said check valve, disconnecting means urging said connecting means away from and out of connection with said cylinder, power operated means for overcoming said disconnecting means and for connecting said fluid line and said cylinder by said connecting means, pressure responsive means normally operative to render said power operated means inoperative, manually controlled means for rendering said pressure responsive means inoperative at will, and weight controlled means for rendering said pressure responsive means operative upon the cylinder being filled with the standard weight of fluid, said connecting means comprising a check valve controlling flow of fluid from the dispensing line, said check valves being opened by said connecting means at the time of connection of said line to said cylinder whereby loss of fluid into the atmosphere is prevented.

5. Apparatus for filling cylinders each of said cylinders having an inlet and a check valve controlling said inlet, with a predetermined standard weight of fluid, comprising in combination cylinder weighing means, a fluid dispensing line for filling said cylinders with fluid, means for positioning one of said cylinders so that it is weighed by the cylinder weighing means and is aligned for connection to said fluid dispensing line, connecting means for connecting said line to said cylinder and for opening said check valve, power operated means for connecting said fluid line and said cylinder by said connecting means, pressure responsive means normally operative to render said power operated means inoperative, manually controlled means for rendering said pressure responsive means inoperative at will, weight controlled means for rendering said pressure responsive means operative upon the cylinder being filled with the standard weight of fluid, and means preventing more than one such operation of said weight controlled means between any two manual actuations of said manually controlled means whereby random operation of said power operated means is prevented, said connecting means comprising a check valve controlling flow of fluid from the dispensing line, said check valves being opened by said connecting means at the time of connection of said line to said cylinder whereby loss of fluid into the atmosphere is prevented.

6. Apparatus for filling cylinders each of said cylinders having an inlet and a check valve controlling said inlet, with a predetermined standard weight of fluid, comprising in combination cylinder weighing means, a fluid dispensing line for filling said cylinders with fluid, means for positioning one of said cylinders so that it is weighed by the cylinder weighing means and is aligned for connection to said fluid dispensing line, connecting means for connecting said line to said cylinder and for opening said check valve, power operative means for connecting said fluid line and said cylinder by said connecting means, pressure responsive means normally operative to render said power operative means inoperative, manually controlled means for rendering said pressure responsive means inoperative at will, and weight controlled means for rendering said pressure responsive means operative upon the cylinder being filled with the standard weight of fluid, said connecting means comprising a check valve controlling flow of fluid from the dispensing line, said check valves being opened by said connecting means at the time of connection of said line to said cylinder whereby loss of fluid into the atmosphere is prevented.

7. Apparatus for filling cylinders each of said cylinders having an inlet and a check valve controlling said inlet, with a predetermined standard weight of fluid, comprising in combination cylinder weighing means, a fluid dispensing line for filling said cylinders with fluid, means for positioning one of said cylinders so that it is weighed by the cylinder weighing means and is aligned for connection to said fluid dispensing line, connecting means for connecting said line to said cylinder and for opening said check valve, power operated means for connecting said fluid line and said cylinder by said connecting means, pressure responsive means normally rendering said power operated means inoperative, manually controlled means for rendering said pressure responsive means inoperative at will, weight controlled means for rendering said pressure responsive means operative upon the cylinder being filled with the standard weight of fluid, and means preventing more than one such operation of said weight controlled means between any two manual actuations of said manually controlled means whereby random operation of said power operated means is prevented.

8. Apparatus for filling cylinders each of said cylinders having an inlet and a check valve controlling said inlet, with a predetermined standard weight of fluid, comprising in combination cylinder weighing means, a fluid dispensing line for filling said cylinders with fluid, means for positioning one of said cylinders so that it is weighed by the cylinder weighing means and is aligned for connection to said fluid dispensing line, connecting means for connecting said line to said cylinder and for opening said check valve, power operated means for connecting said fluid line and said cylinder by said connecting means, pressure responsive means normally rendering said power operated means inoperative, manually controlled means for rendering said pressure responsive means inoperative at will, and weight controlled means for rendering said pressure responsive means operative upon the cylinder being filled with the standard weight of fluid.

9. Apparatus for filling cylinders each of said cylinders having an inlet and a check valve controlling said inlet, with a predetermined standard weight of fluid, comprising in combination cylinder weighing means, a fluid dispensing line for filling said cylinders with fluid, means for positioning one of said cylinders so that it is weighed by the cylinder weighing means and is aligned for connection to said fluid dispensing line, connecting means for connecting said line to said cylinder and for opening said check valve, disconnecting means urging said connecting means away from and out of connection with said cylinder, power operated means for overcoming said disconnecting means and for connecting said fluid line and said cylinder by said connecting means, pressure responsive means normally rendering said power operated means inoperative, manually controlled means for rendering said pressure responsive means inoperative at will, and weight controlled means for rendering said pressure responsive means operative upon the cylinder being filled with the standard weight of fluid.

10. Apparatus for filling cylinders each of said cylinders having an inlet and a check valve controlling said inlet, with a predetermined standard weight of fluid, comprising in combination cylinder weighing means, a fluid dispensing line for filling said cylinders with fluid, means for positioning one of said cylinders so that it is weighed by the cylinder weighing means and is aligned for connection to said fluid dispensing line, connecting means for connecting said line to said cylinder and for opening said check valve, power operated means for connecting said fluid line and said cylinder by said connecting means, manually controlled means for actuating said power operated means at will, and weight controlled means for actuating said manually controlled means upon the cylinder being filled with the standard weight of fluid to render said power operated means inoperative.

11. Apparatus for filling cylinders each of said cylinders having an inlet and a check valve controlling said inlet, with a predetermined standard weight of fluid, comprising in combination cylinder weighing means, a fluid dispensing line for filling said cylinders with fluid, means for positioning one of said cylinders so that it is weighed by the cylinder weighing means and is aligned for connection to said fluid dispensing line, connecting means for connecting said line to said cylinder and for opening said check valve, power operated means for connecting said fluid line and said cylinder by said connecting means, manually controlled means for actuating said power operated means at will, weight controlled means for actuating said manually controlled means upon the cylinder being filled with the standard weight of fluid to render said power operated means inoperative, and means preventing more than one such operation of the weight controlled means between any two manual actuations of said manually controlled means whereby bouncing or teetering of the weighing means cannot cause random operation of said power operated means.

12. An apparatus for filling cylinders having a connection opening and a first check valve controlling said opening comprising in combination a stand, guide means on said stand whereby one of said cylinders may be aligned with said connection opening in a filling position, a power operated connector head connected to said stand, a connector member slidable in said head from an extended position of connection to said connection opening of said cylinder when said cylinder is in said filling position to a retracted position, a sleeve slidable on said connector member and adapted to enter said connection opening on said cylinder to position the connector member for connection to said connection opening, a fluid line in communication with said connector member supplying fluid for filling said cylinder, connecting means, a second check valve controlling flow of fluid from said fluid line, said first and second check valves being opened by said connecting means at the time of connection of said line to said cylinder whereby loss of fluid into the atmosphere is substantially prevented, means in said head urging said connector member into said retracted position and power operated means in said head urging said connector member into said extended position.

13. An apparatus for filling cylinders having a connection opening comprising in combination a stand, guide means on said stand whereby one of said cylinders may be aligned with said connection opening in a filling position, a power operated connector head connected to said stand, a connector member slidable in said head from an extended position of connection to said connection opening of said cylinder when said cylinder is in said filling position to a retracted position, a sleeve slidable on said connector member and adapted to enter said connection opening on said cylinder to position the connector member for connection to said connection opening, a fluid line in communication with said connector member supplying fluid for filling said cylinder, means in said head urging said connector member into said retracted position and power operated means in said head urging said connector member into said extended position.

14. An apparatus for filling cylinders having a connection opening and a first check valve controlling said opening comprising in combination a stand, means whereby one of said cylinders may be aligned with said connection opening in a filling position, a power operated connector head connected to said stand, a connector member slidable in said head from an extended position of connection to said connection opening of said cylinder when said cylinder is in said filling position to a retracted position, a sleeve slidable on said connector member and adapted to enter said connection opening on said cylinder to position the connector member for connection to said connection opening, a fluid line in communication with said connector member supplying fluid for filling said cylinder, a second check valve controlling flow of fluid from said fluid line, means for opening said first and second check valves at the time of connection of said line to said cylinder whereby loss of fluid into the atmosphere is substantially prevented, means in said head urging said connector member into said retracted position and power operated means in said head urging said connector member into said extended position.

15. An apparatus for filling cylinders having a connection opening comprising in combination a stand, means whereby one of said cylinders may be aligned with said connection opening in a filling position, a power operated connector head connected to said stand, a connector member slidable in said head from an extended position of connection to said connection opening of said cylinder when said cylinder is in said filling position to a retracted position, a sleeve slidable on said connector member and adapted to enter said connection opening on said cylinder to position the connector member for connection to said connection opening, a fluid line in communication with said connector member supplying fluid for filling said cylinder, means in said head urging said connector member into said retracted position and power operated means in said head urging said connector member into said extended position.

16. Apparatus for filling cylinders each of said cylinders having an inlet and a first check valve controlling said inlet, comprising in combination a fluid dispensing line for filling said cylinders with fluid, means for positioning one of said cylinders so that it is aligned for connection to said fluid dispensing line, connecting means for connecting said line to said cylinder and for opening said check valve, positive mechanical spring disconnecting means urging said connecting means away from and out of connection with said cylinder, power operated means for overcoming said disconnecting means and for connecting said fluid line and said cylinder by said connecting means, pressure responsive means normally rendering said power operated means inoperative, and manually controlled means for rendering said pressure responsive means inoperative at will, a second check valve controlling flow of fluid from the dispensing line, said first and second check valves being opened by said connecting means at the time of connection of said line to said cylinder whereby loss of fluid into the atmosphere is prevented.

17. Apparatus for filling cylinders each of said cylinders having an inlet and a check valve controlling said inlet, comprising in combination a fluid dispensing line for filling said cylinders with fluid, means for positioning one of said cylinders so that it is aligned for connection to said fluid dispensing line, connecting means for connecting said line to said cylinder and for opening said check valve, positive mechanical spring disconnecting means urging said connecting means away from and out of connection with said cylinder, power operated means for overcoming said disconnecting means and for connecting said fluid line and said cylinder by said connecting means, pressure responsive means normally rendering said power operated means inoperative, and manually controlled means for rendering said pressure responsive means inoperative at will.

18. In an apparatus for filling cylinders having a connection opening controlled by a first check valve recessed in said opening and having a thrust operated valve opening member in said opening, a connector comprising a connector arm having a fluid passage therein, a thrust operated second check valve in said passage, a push pin slidable in said passage and projecting therefrom, said push pin being so disposed as to operate both of said check valves together upon movement of said arm, a guide sleeve slidably splined to said arm and constructed and disposed to enter said opening to direct said push pin for movement against the operating member of said first check valve, and means to reciprocate said arm into and out of connection with said cylinder comprising a connector head pivoted eccentrically for tilting movement, said head having a chamber, a diaphragm in said chamber, means supplying fluid pressure to move said diaphragm in one direction, and spring means urging said diaphragm in the opposite direction, said arm being connected for said reciprocating movement by said diaphragm and for sliding movement relative to said head.

19. In an apparatus for filling cylinders having a connection opening controlled by a first check valve recessed in said opening and having a thrust operated valve opening member in said opening, a connector comprising a connector arm having a fluid passage therein, a thrust operated second check valve in said passage, a push pin slidable in said passage and projecting therefrom, said push pin being so disposed as to operate both of said check valves together upon movement of said arm, a guide sleeve slidably splined to said arm and constructed and disposed to enter said opening to direct said push pin for movement against the operating member of said first check valve, and means to reciprocate said arm into and out of connection with said cylinder.

20. In an apparatus for filling cylinders having a connection opening controlled by a first check valve recessed in said opening and having a thrust operated valve opening member in said opening, a connector comprising a connector arm having a fluid passage therein, a thrust operated second check valve in said passage, a push pin slidable in said passage and projecting therefrom, said push pin being so disposed as to operate both of said check valves together upon movement of said arm, a guide sleeve slidably splined to said arm and constructed and disposed to enter said opening to direct said push pin for movement against the operating member of said first check valve, and means to reciprocate said arm into and out of connection with said cylinder comprising a connector head, said head having a chamber, a diaphragm in said chamber, means supplying fluid pressure to move said diaphragm in one direction, and spring means urging said diaphragm in the opposite direction, said arm being connected for said reciprocating movement by said diaphragm and for sliding movement relative to said head.

OWEN L. GARRETSON.
THEODORE A. ST. CLAIR.
ANDREW R. OLSON.